(12) United States Patent
Kadota (10) Patent No.: US 7,706,033 B2
(45) Date of Patent: Apr. 27, 2010

(54) IMAGE PROCESSING DEVICE, IMAGE PROCESSING METHOD, AND MEDIUM INCLUDING IMAGE PROCESSING PROGRAM

(75) Inventor: Masatoshi Kadota, Aichi (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 365 days.

(21) Appl. No.: 11/765,672

(22) Filed: Jun. 20, 2007

(65) Prior Publication Data
US 2007/0291313 A1 Dec. 20, 2007

(30) Foreign Application Priority Data
Jun. 20, 2006 (JP) .............................. 2006-170682

(51) Int. Cl.
*G06K 15/00* (2006.01)
*G06K 9/00* (2006.01)
*G03F 3/08* (2006.01)

(52) U.S. Cl. ..................... 358/520; 358/3.01; 358/3.09; 358/521; 382/167

(58) Field of Classification Search ........................ None
See application file for complete search history.

(56) References Cited

U.S. PATENT DOCUMENTS 7,013,043 B2  3/2006  Kashioka

FOREIGN PATENT DOCUMENTS

| JP | 59128873 | 7/1984 |
|---|---|---|
| JP | 9-009007 A | 1/1997 |
| JP | 10111624 | 4/1998 |
| JP | 11-088712 A | 3/1999 |
| JP | 2001-268378 A | 9/2001 |
| JP | 2002-010090 A | 1/2002 |
| JP | 2005079750 | 3/2005 |
| JP | 2005-135321 A | 5/2005 |

OTHER PUBLICATIONS

Copending Commonly Assigned U.S. Appl. No. 11/765,729, filed Jun. 20, 2007.
JP Office Action dtd Apr. 15, 2008, JP Appln. 2006-170681.
JP Office Action dtd Apr. 15, 2008, JP Appln. 2006-170682.

*Primary Examiner*—Mark Zimmerman
*Assistant Examiner*—Haris Sabah
(74) *Attorney, Agent, or Firm*—Banner & Witcoff, Ltd.

(57) ABSTRACT

An image processing device includes an image generating unit configured to generate image data expressed a single hue from color image data, which include at least a first area to be filled with a first color based on first hue component data and a second area to be filled with a second color based on second hue component data, the first and second areas defining a boundary line by line contact or overlap therebetween, a density determining unit that determines a first density and a second density in the single-hue image data based on the first hue component data and second hue component data, respectively, a comparing unit that compares the first density with the second density, and a boundary generating unit that generates the boundary line with the single hue of a third density different from the first and second densities based on the comparison result by the comparing unit.

11 Claims, 6 Drawing Sheets

IMAGE PROCESSING DEVICE, IMAGE PROCESSING METHOD, AND MEDIUM INCLUDING IMAGE PROCESSING PROGRAM

CROSS-REFERENCE TO RELATED APPLICATION

This application claims priority under 35 U.S.C. §119 from Japanese Patent Application No. 2006-170682, filed on Jun. 20, 2006. The entire subject matter of the application is incorporated herein by reference.

BACKGROUND

1. Technical Field

The following description relates to one or more image processing techniques to clearly differentiate two areas in a single-hue image including a plurality of areas expressed by the same hue or achromatic color.

2. Related Art

There is disclosed in Japanese Patent Provisional Publication No. 2005-79750 (see paragraph 0014 or FIG. 1) a technique to extract a character highlighted in a color image before converting the color image into a monochrome image and express the extracted character as a character of the maximum density or an outline character, so as to solve a problem that it is hard to discriminate, from a background, the extracted character that has almost the same density as that of the background in the monochrome image.

However, the above technique, disclosed in Japanese Patent Provisional Publication No. 2005-79750, can be applied to a character that is previously highlighted in the color image. Therefore, for example, when adjacent areas in a circle graph have their respective different hues and yet the same brightness (density) in the original color image, even though using the above technique, it is impossible to differentiate the adjacent areas in the monochrome image.

SUMMARY

Aspects of the present invention are advantageous in that there can be provided one or more improved techniques that make it possible to generate a single-hue image such that adjacent areas included therein, which have their respective different hues in an original color image, can clearly be discriminated.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided an image processing device, which includes an image generating unit configured to generate image data expressed by a single hue from color image data, which include at least two records of a first area to be filled with a first color based on first hue component data and a second area to be filled with a second color based on second hue component data, the first and second areas defining a boundary line by one of line contact and overlap therebetween, a density determining unit configured to determine a first density of the first area and a second density of the second area in the single-hue image data based on the first hue component data and second hue component data, respectively, a comparing unit configured to compare the first density with the second density, and a boundary generating unit configured to generate the boundary line with the single hue of a third density different from the first and second densities based on the comparison result by the comparing unit.

According to some aspects, it is possible to visually recognize the boundary line in the single-hue image and to clearly differentiate the first and second areas.

Optionally, the comparing unit may include a density difference judging unit configured to judge whether a density difference between the first and second densities is lower than a predetermined value. In this case, the boundary generating unit may be configured to generate the boundary line with the single hue of the third density when the density difference judging unit judges that the density difference is lower than the predetermined value.

According to some aspects, by considering a predetermined value of the density difference when comparing the first and second densities, it is possible to prevent a problem that the second density of the second area, visually almost the same as the first density of the first area, is strictly judged different from the first density based on the accurate first and second densities.

Optionally, the image processing device may further include a boundary density determining unit configured to determine the third density such that a difference between the third density and an average density between the first and second densities is lower than a predetermined value. In this case, the boundary generating unit may be configured to generate the boundary line with the single hue of the third density determined by the boundary density determining unit.

Still optionally, the comparing unit may include an original color comparing unit configured to judge whether the first color of the first area is different from the second color of the second area in the color image data based on the first hue component data and second hue component data. In this case, the boundary generating unit may be configured to generate the boundary line with the single hue of the third density when the original color comparing unit judges that the first color is different from the second color.

According to some aspects, when a single area is to be represented by the first and second area that have the same hue component data, it is possible to represent the first and second areas as a single area even in the single-hue image.

Yet optionally, the image processing device may further include a density judging unit configured to judge whether an average density between the first and second densities is lower than a predetermined density, and a boundary density determining unit configured to determine the third density that is higher than the average density when the density judging unit judges that the average density is lower than the predetermined density and otherwise lower than the average density.

In some aspects, it is possible to further clearly differentiate the first and second areas.

According to another aspect of the present invention, there is provided an image processing method including steps of generating image data expressed a single hue from color image data, which include at least two records of a first area to be filled with a first color based on first hue component data and a second area to be filled with a second color based on second hue component data, the first and second areas defining a boundary line by one of line contact and overlap therebetween, determining a first density of the first area and a second density of the second area in the single-hue image data based on the first hue component data and second hue component data, respectively, comparing the first density with the second density, and generating the boundary line with the single hue of a third density different from the first and second densities based on the comparison result in the step of comparing.

According to the image processing method configured as above, the same effects as the aforementioned image processing device can be expected.

According to a further aspect of the present invention, there is provided a computer usable medium having computer readable instructions stored thereon, which, when executed by a computer, cause the computer to perform steps of generating image data expressed a single hue from color image data, which include at least two records of a first area to be filled with a first color based on first hue component data and a second area to be filled with a second color based on second hue component data, the first and second areas defining a boundary line by one of line contact and overlap therebetween, determining a first density of the first area and a second density of the second area in the single-hue image data based on the first hue component data and second hue component data, respectively, comparing the first density with the second density, and generating the boundary line with the single hue of a third density different from the first and second densities based on the comparison result in the step of comparing.

By executing the instructions stored on the computer usable medium configured as above, the same effects as the aforementioned image processing device can be expected.

Illustrative Aspects

Figure 1:
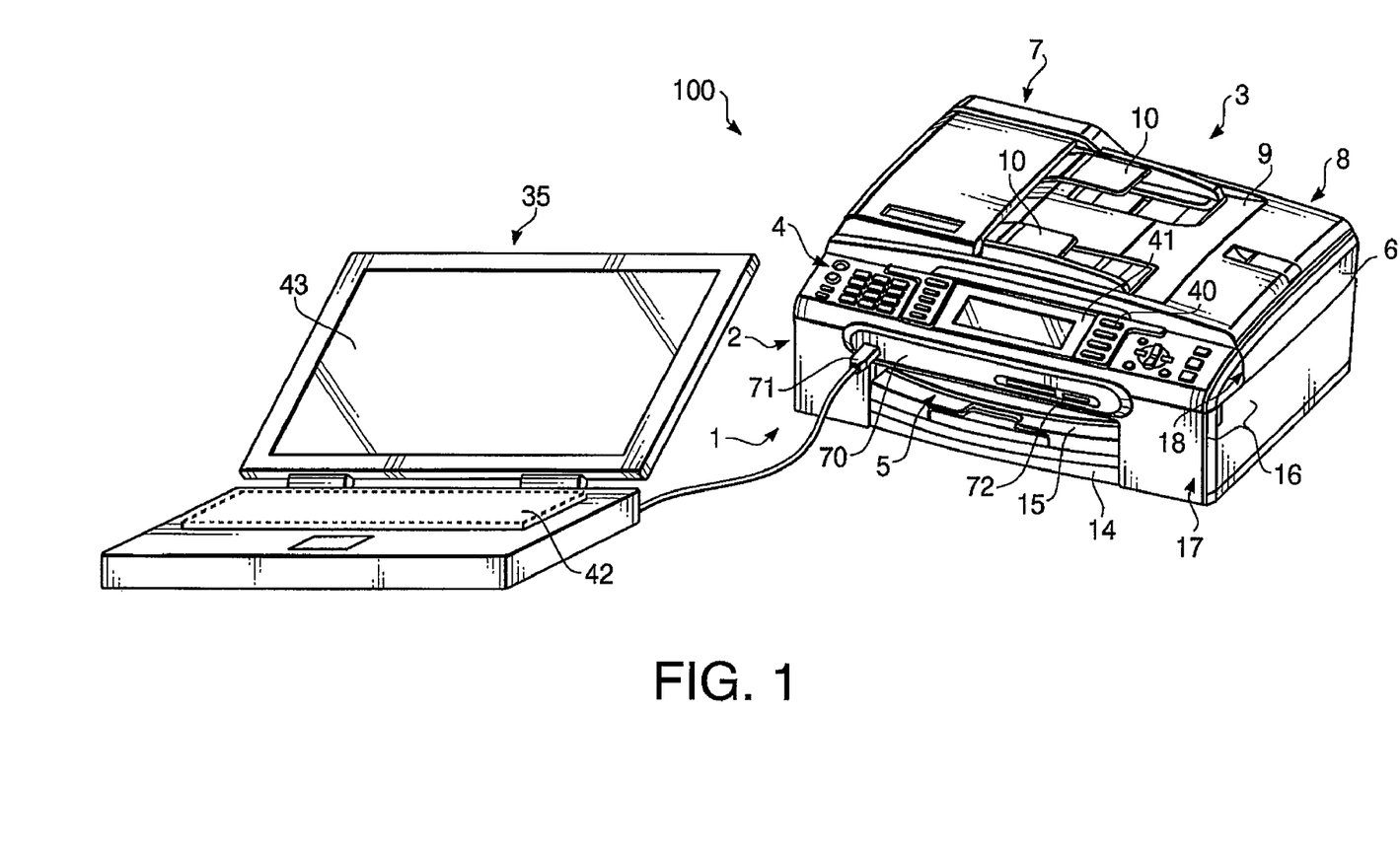
FIG. 1 is a perspective view showing a configuration of an image generating system in accordance with one or more aspects of the present invention.

Hereinafter, an embodiment according to aspects of the present invention will be described with reference to the accompanying drawings. FIG. 1 is a perspective view showing an external configuration of each of an MFP (Multi Function Peripheral) 1 and a personal computer 35 (hereinafter, simply referred to as a "PC 35") in an embodiment.

The MFP 1 is provided with a scanner function, copy function, and facsimile function. There is provided at the front side of the MFP 1 an operating panel 4. The operating panel 4, provided for operating a printer 2 and a scanner 3, includes various operation keys 40 and an LCD (Liquid Crystal Display) 41. A user can input an intended instruction using the operating panel 4. When the intended instruction is inputted to the MFP 1, the MFP 1 is controlled by a control unit 20 based on the inputted instruction. It is noted that the MFP 1 is configured to be controlled based on an instruction transmitted from a computer connected therewith via a printer driver or a scanner driver as well as the instruction inputted through the operating panel 4.

Figure 2:
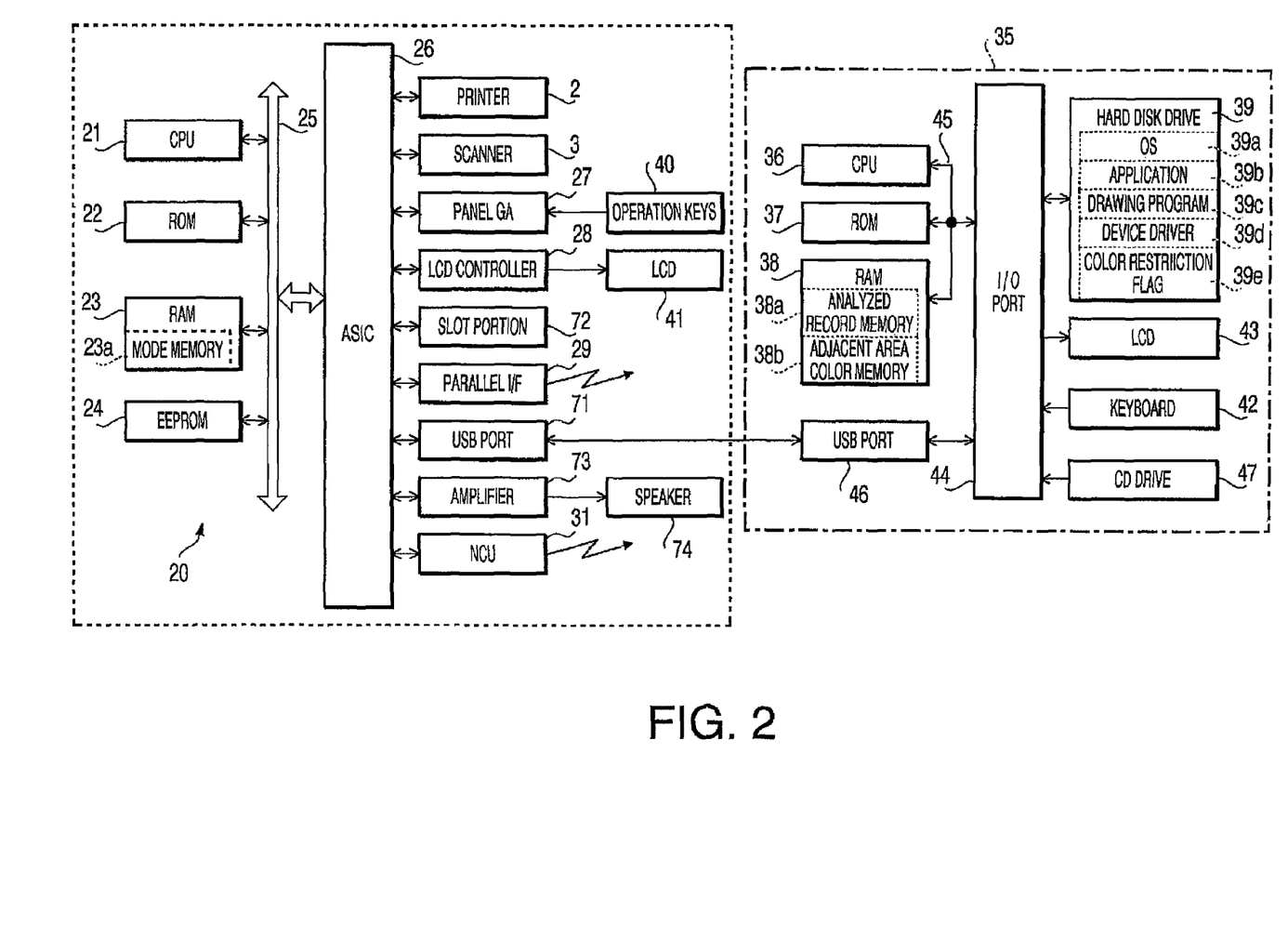
FIG. 2 is a block diagram showing schematic configurations of an MFP and a PC included in the image generating system in accordance with one or more aspects of the present invention.

Referring to FIG. 2, a schematic configuration of the control unit 20 that controls the operation of the MFP 1 will be explained. FIG. 2 is a block diagram schematically showing a configuration of the control unit 20 of the MFP 1. The control unit 20 controls the operation of the MFP 1 including the printer 2, scanner 3, and operating panel 4 in a comprehensive manner. As shown in FIG. 2, the control unit 20 is configured as a microcomputer that includes, as main elements thereof, a CPU (Central Processing Unit) 21, ROM (Read Only Memory) 22, RAM (Random Access Memory) 23, and EEPROM (Electrically Erasable and Programmable ROM) 24. Further, the control unit 20 is connected with an ASIC (Application Specific Integrated Circuit) 26 via a bus 25.

Figure 4:
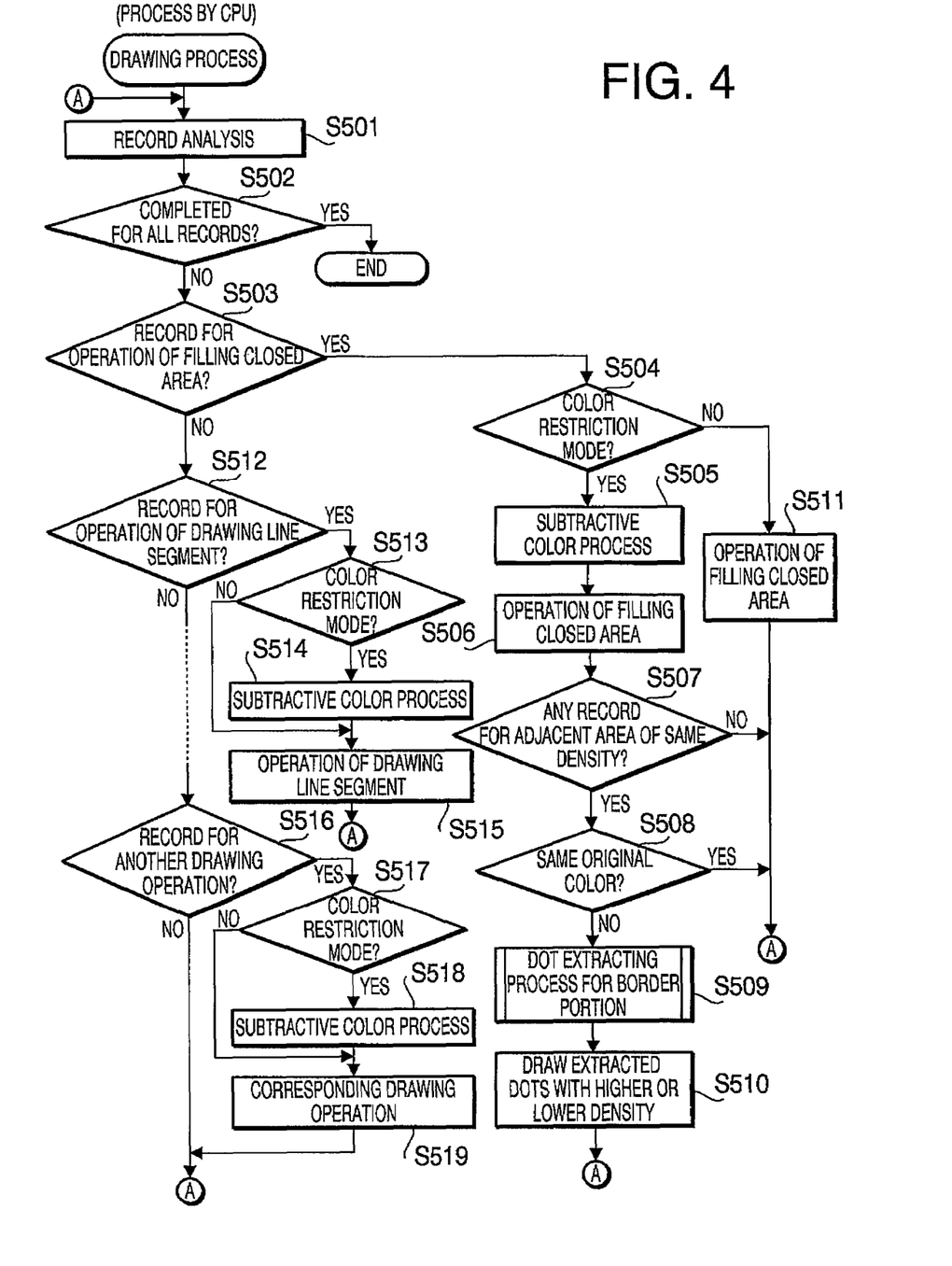
FIG. 4 is a flowchart showing a drawing process in accordance with one or more aspects of the present invention.
Figure 5:
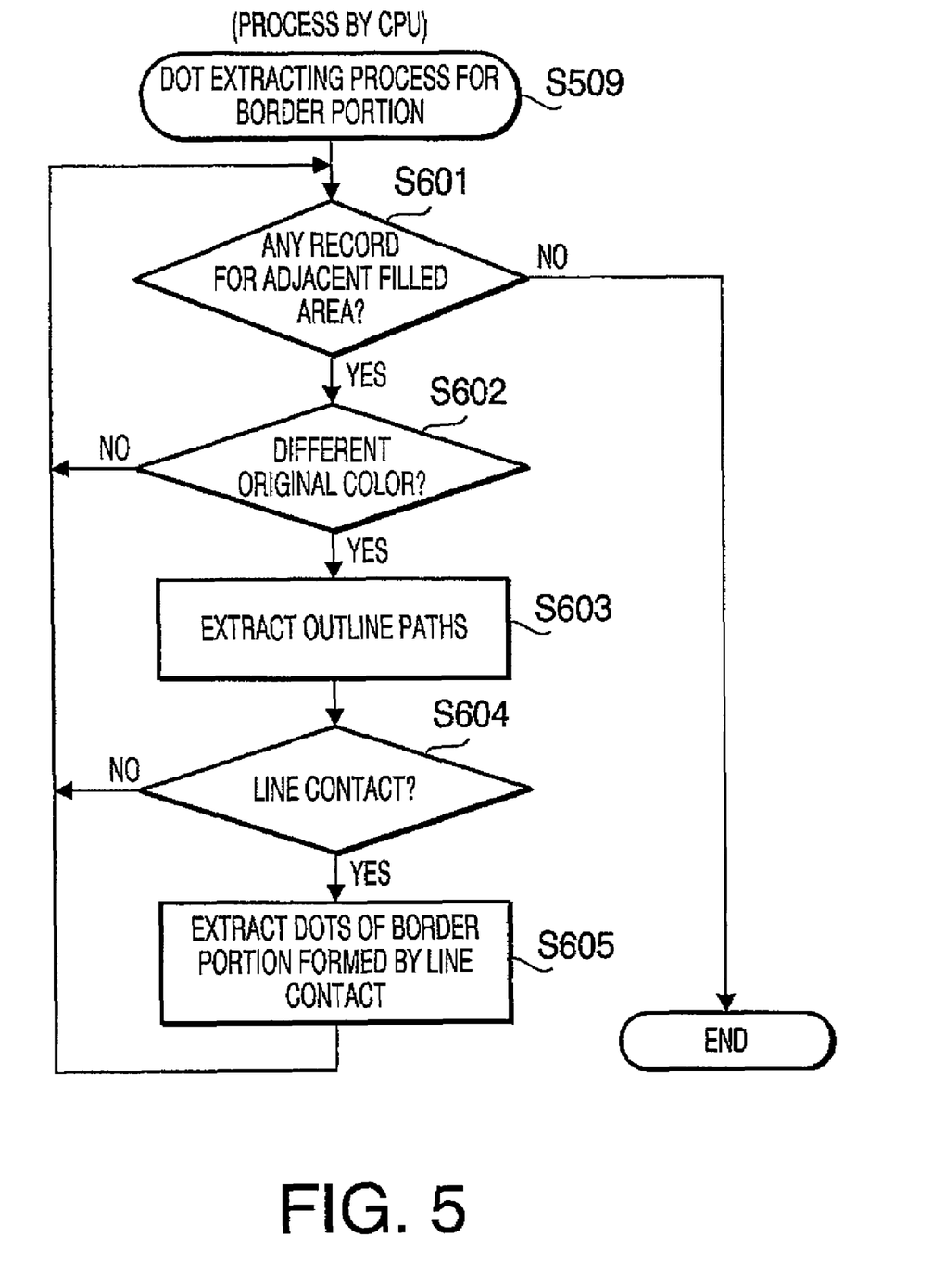
FIG. 5 is a flowchart showing a dot extracting process in accordance with one or more aspects of the present invention.
Figure 6:
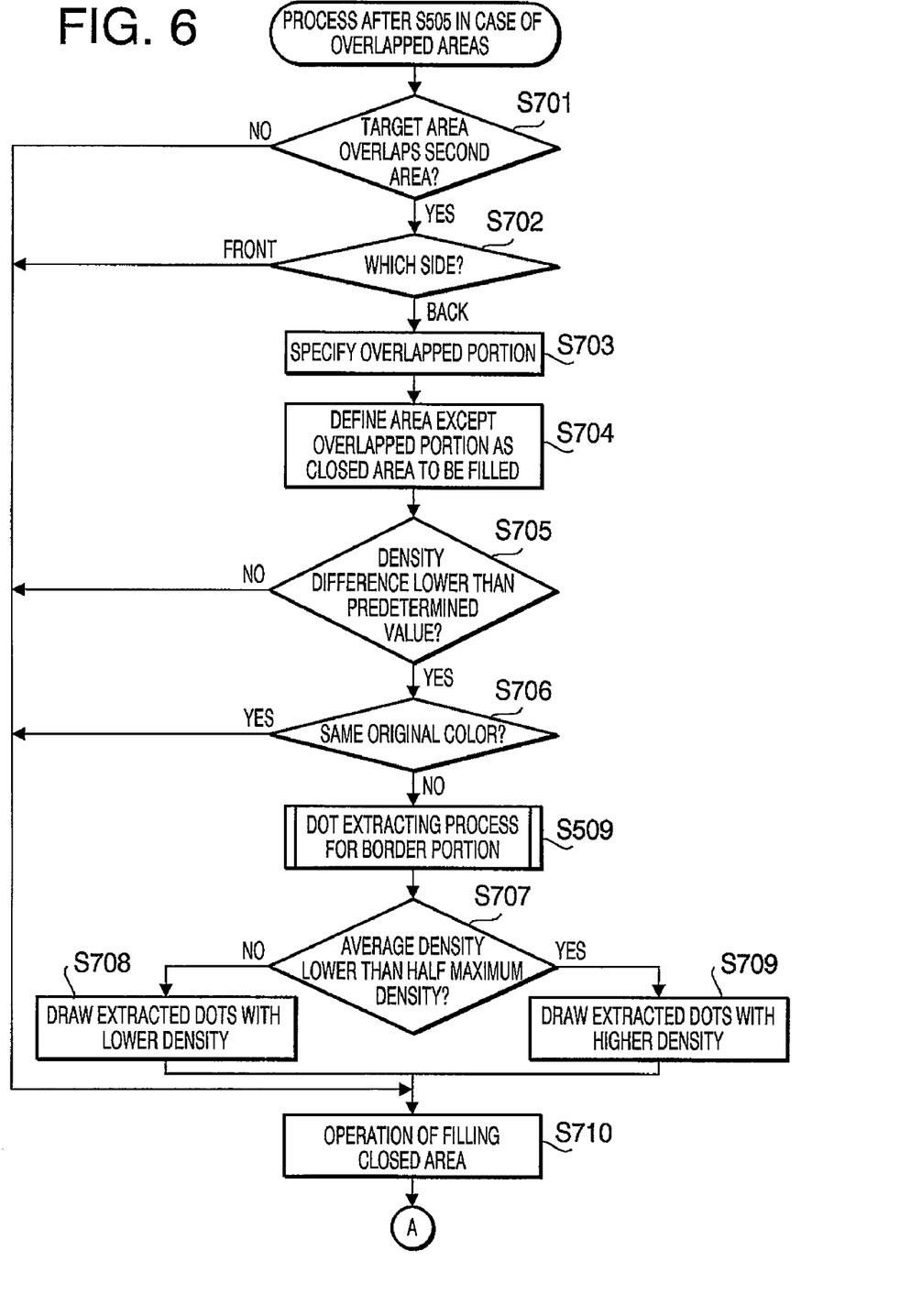
FIG. 6 is a flowchart showing an example of a process after a step S505 in the drawing process shown in FIG. 4 in accordance with one or more aspects of the present invention.

The CPU 21 is a central processing unit that controls the MFP 1 in a comprehensive manner, and executes various programs such as programs as shown by flowcharts in FIGS. 4, 5, and 6. There are stored in the ROM 22 programs for controlling various operations of the MFP 1.

The RAM 23 is employed as a memory area or work area that temporarily stores various data used when the CPU 21 executes the various programs.

The ASIC 26 controls operations of the printer 2, scanner 3, operating panel 4, and a slot portion 72 based on an instruction from the CPU 21 (for example, the ASIC 26 controls operations of a motor that drives the printer 2, an inkjet recording head, a motor that drives an ADF (Auto Document Feeder) 7 of the scanner 3, and the image scanning unit). Detailed explanation on configurations of the printer 2, scanner 3, and slot portion 72, which are publicly known, will be omitted.

The ASIC 26 is connected with a panel gate array (panel GA) 27 that controls the operation keys 40 for inputting an intended instruction to the MFP 1, an LCD controller 28 that controls screen display on the LCD 41, a parallel interface (parallel I/F) 29 for data communication with an external device such as a computer via a parallel cable, and a USB port 71 for data communication with an external device such as a personal computer and a digital camera via the USB cable. Further, the ASIC 26 is connected with an NCU (Network Control Unit) 31.

Meanwhile, the PC 35 includes a CPU 36, ROM 37, RAM 38, hard disk drive 39, input/output port (I/O port) 44, USB port 46, and CD drive 47. The CPU 36 controls each of the units connected therewith via a bus line 45 based on fixed values or programs stored in the ROM 37, or various signals received via the USB port 46. The ROM 37 is a non-rewritable memory that stores a control program to be executed by the PC 35 and the like. The RAM 38 is a memory that temporarily stores various data and programs, and provided with an analyzed record memory 38$a$ and adjacent area color memory 38$b$. The analyzed record memory 38$a$ is a memory that temporarily stores an analysis result for each of a plurality of records included in the image data. The adjacent area color memory 38b is a memory that stores a color after a color reduction process (described below) for an adjacent area of a record under analysis.

The hard disk drive 39 is a rewritable nonvolatile memory that stores therein an OS (Operating System) 39a, application 39b, drawing program 39c, device driver 39d, color restriction flag 39e, and the like. The OS 39a is basic software such as Windows (trademark registered). The application 39b is, for example, software for creating a presentation material with which various kinds of characters and figures can be created. The drawing program 39c is software including a function of converting data generated by the application 39b into a format in which the converted data can be processed by the device driver 39d so as to establish a functional linkage between the application 39b and the device driver 39d. The drawing program 39c is referred to as a GDI in the aforementioned Windows (trademark registered). A below-mentioned drawing process shown in FIG. 4 is performed in accordance with the drawing program 39c. The device driver 39d, which normally drives a peripheral device (the MFP 1 in the embodiment) connected with the PC 35, is software that establishes a functional linkage between the PC 35 and the MFP 1. For example, the device driver 39d converts image data generated by the drawing program 39c into data described in PDL (Page Description Language). The color restriction flag 39e is an indicator that indicates whether to restrict the color printing, and is configured to be settable in each user. When the color restriction flag 39e is set ON, the color printing is restricted. The USB port 46 is configured to be connectable with the USB cable to communicate with a USB device such as the MFP 1.

It is noted that the aforementioned CPU 36, ROM 37, and RAM 38 are interconnected via the bus line 45, and the bus line 45 is connected with the I/O port 41. The I/O port 41 is connected with the hard disk drive 39, a keyboard 42, an LCD 43, and USB port 46 as well as the bus line 45.

Figure 3A:
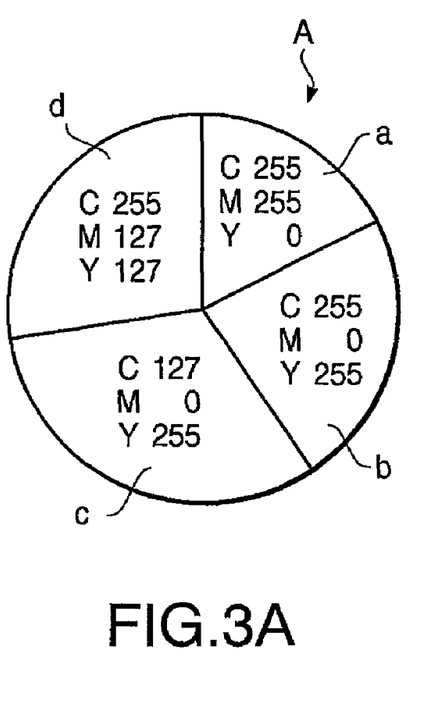
FIGS. 3A, 3B, and 3C are illustrations for explaining a concept of the present invention, and respectively show a circle graph in an original color image, a circle graph corresponding to the circle graph shown in FIG. 3A in a single-hue image into which the original color image is converted in a conventional method, and a circle graph corresponding to the circle graph shown in FIG. 3A in a single-hue image into which the original color image is converted in a method according to one or more aspects of the present invention.
Figure 3B:
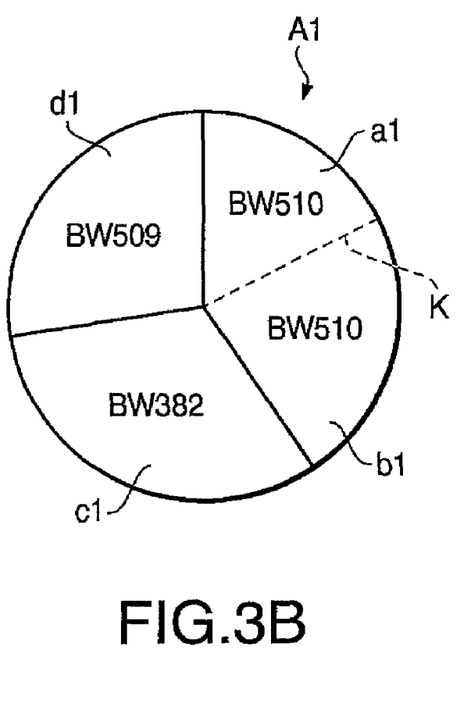
Figure 3C:
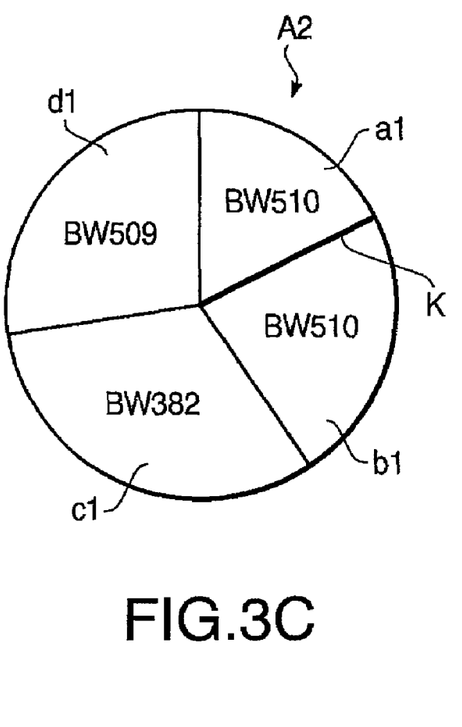

Subsequently, with reference to FIGS. 3A, 3B, and 3C, a concept of the present invention will be explained. FIG. 3A shows a circle graph A in an original color image. FIG. 3B shows a circle graph A1 corresponding to the circle graph A in a single-hue image into which the original color image is converted in a conventional method. FIG. 3C shows a circle graph A2 corresponding to the circle graph A in a single-hue image into which the original color image is converted in a method according to aspects of the present invention. It is noted that the single-hue image means an image composed of a plurality of areas expressed by the same hue or an achromatic color. In this case, since the single-hue image can be expressed by a single sort of ink or toner, a running cost for forming the single-hue image can further be reduced.

The circle graph A shown in FIG. 3A is sectioned into an area a, area b, area c, and area d. The area a is expressed by a color based on hue component data of C (Cyan): 255, M (Magenta): 255, and Y (Yellow): 0. The area b is expressed by a color based on hue component data of C: 255, M: 0, and Y: 255. The area c is expressed by a color based on hue component data of C: 127, M: 0, and Y: 255. The area d is expressed by a color based on hue component data of C: 255, M: 127, and Y: 127. Hence, it is possible to clearly distinguish the areas a through d that are expressed by different colors based on the different hue component data, respectively. In addition, a background area outside the circle graph A is expressed by white color (C: 0, M: 0, Y: 0).

Meanwhile, when the circle graph A shown in FIG. 3A is converted into a circle graph expressed as a single-hue image in the conventional method, the circle graph A is converted as the circle graph A1 shown in FIG. 3B. More specifically, the original color in each of the areas a through d shown in FIG. 3A is converted into the single hue of a density value represented by the sum of hue components (density values of C, M, and Y) included in the hue component data of the original color. Namely, an area a1 corresponding to the area a is expressed by a density value of BW: 510 (the sum of the hue components of the area a, that is, the sum of 255, 255, and 0), and an area b1 corresponding to the area b is expressed by a density value of BW: 510. Further, an area c1 corresponding to the area c is expressed by a density value of BW: 382, and an area d1 corresponding to the area d is expressed by a density value of BW: 509. In this case, when each of the hue components C, M, and Y for an original color indicates a maximum density value (255), the original color is converted into black color. Meanwhile, when each of the hue components C, M, and Y for an original color indicates a minimum density value, the original color is converted into white color. In the embodiment, the density value of the single hue is represented by the sum of the hue components included in the hue component data. However, the density value may be represented by the average value of the hue components. When the circle graph A shown in FIG. 3A is converted into the circle graph A1 as the single-hue image shown in FIG. 3B, the area a1 has the same density of the single hue as the area b1. Thereby, there is caused a problem that a boundary line K (dashed line) between the area a1 and the area b1 cannot visually recognized, i.e., it is impossible to differentiate the areas a1 and b1. Thus, different colors in an original color image that can visually be differentiated might be converted into a single hue of the same density that cannot be differentiated. Such a case causes a significant problem, for example, when a presentation material including many circle graphs or the like is printed as a single-hue image. Additionally, even a printed material that is not the presentation material might not be good enough for use, depending on how the printed material is utilized.

In the embodiment, as shown in FIG. 3C, an image is generated to have the boundary line K between the adjacent areas a1 and b1 that is different in the density from both of the areas a1 and b1. In other words, when the area a1 has the same density as the area b1 adjacent to the area a1, there is generated an image such that the boundary line K between the areas a1 and b1 has a density different from those of the areas a1 and b1. Thereby, the boundary line K between the areas a1 and b1 can be visually recognized and clearly distinguished.

Next, referring to a flowchart shown in FIG. 4, there will be explained a drawing process to be executed by the PC 35 in the image generating system configured as above. When the user has issued a printing instruction to the application 39b, the application 39b transmits printing data to the OS 39a. The OS 39a spools the printing data in an intermediate file. Then, the intermediate file is sent to a print processor as a module included in the OS, and the print processor sends the printing data to a printer driver. The intermediate file is a data aggregate referred to as a record. There are various kinds of records such as a record including an instruction and data for drawing a line, a record for filling an area, and a record including data for drawing a character. An intended drawing operation can be performed with such records being executed in a recorded order by the aforementioned print processor or printer driver.

FIG. 4 is a flowchart showing the drawing process. It is noted that the drawing process in the embodiment is generally to be executed by the printer driver, yet the flowchart shown in FIG. 4 also partially includes operations to be performed by the print processor so as to clarify an entire flow of the data processing. According to the printing device in the embodiment, as described above, the running cost for the color printing is higher than that for the monochrome printing. For this reason, the printing device in the embodiment has a color restriction mode for reducing the running cost. In the color restriction mode, even though the color printing is selected, a single-hue (monochrome) image is forcibly generated. In the embodiment, a login name for the OS 39a is compared with user names of predetermined users permitted to utilize the color printing. When the log-in name is not identical to any of the user names of the predetermined users, the color restriction flag 39e is set ON to indicate that the color restriction mode is set, and otherwise the color restriction flag 39e is set OFF.

In the drawing process, firstly, one record, picked up from the records included in the intermediate file as a target record, is analyzed (S501). Then, it is judged whether all of the records included in the image data are completely analyzed (S502). When it is judged that all of the records are completely analyzed (S502: Yes), the process is terminated. It is noted that an analysis result for each of the analyzed records is temporarily stored in the analyzed record memory 38a until all of the records included in the image data are completely analyzed.

When it is not judged that all of the records are completely analyzed (S502: No), it is judged whether a target record is a record for an operation of filling a closed area (S503). When it is judged that the target record is a record for an operation of filling a closed area (S503: Yes), it is judged whether the color restriction mode is active (S504). It is possible to judge whether the color restriction mode is active by checking whether the color restriction flag 39e is set ON. When it is not judged that the color restriction mode is active (S504: No), the operation of filling the closed area is performed (S511), and then the process is repeated from the step S501.

Meanwhile, when it is judged that the color restriction mode is active (S504: Yes), the color reduction process is performed to convert the original color of the filled area based on the hue component data into the single hue of the density corresponding to the sum of the hue components (S505). Thereafter, the operation of filling the closed area is performed with the single hue of the density (S506). It is noted that hue component data for each of the filled areas is included in each relevant record. Then, it is judged whether there is a record of an adjacent area of the same density as the area of the target record among the analyzed records stored in the RAM 38 (S507). When the judgment in the step S507 is affirmative (S507: Yes), it is judged whether the adjacent area judged to be of the same density has the same original color (hue component data) as the target area (S508). When it is not judged that the adjacent area judged to be of the same density has the same original color as the target area (S508: No), a dot extracting process for extracting dots of a boundary portion between the adjacent areas is performed (S509).

Subsequently, with reference to a flowchart shown in FIG. 5, the dot extracting process (S509) will be described. FIG. 5 is a flowchart showing the dot extracting process. The dot extracting process is a process of extracting dots of a boundary portion between adjacent areas that have the same density in the single-hue image and different original colors.

Now suppose that the target record in the step S509 is a N-th record analyzed in the step S501. In this case, (N−1) records have already been analyzed, and the (N−1) records are to be examined.

In this process, firstly, it is judged whether there is a record of an adjacent filled area among the (N−1) records (S601). When it is judged that there is a record of an adjacent filled area (S601: Yes), it is judged whether the adjacent area has an original color different from that for the target filled area (S602). When it is judged that the adjacent area has an original color different from that for the target filled area (S602: Yes), outline paths are extracted from records corresponding to the adjacent areas (S603). Then, it is judged whether the adjacent areas establish line contact with one another (S604). When it is judged that the adjacent areas establish line contact with one another (S604: Yes), dots of a boundary portion formed by the line contact are extracted (S605), and thereafter the process is repeated from the step S601.

Meanwhile, when it is not judged that the adjacent area has an original color different from that for the target filled area, namely when it is judged that both of the target area and adjacent area have the same original color (S602: No), the process is repeated from the step S601. Further, when it is not judged in the step S604 that the adjacent areas establish line contact with one another (S604: No), the process is repeated from the step S601. Then, when it is not judged that there is a record of an adjacent filled area (S601: No), the process is terminated. Thus, it is possible to extract the dots of the portion where there is established the line contact between the target filled area and the adjacent area that has the same density as the target filled area in the single-hue image and an original color different from that of the target filled area in the original color image data.

Referring to FIG. 4 again, the explanation on the drawing process will be continued. When there have been extracted the dots of the portion (boundary line) formed by the line contact of the target area with the adjacent area in the step S509, the density of the extracted dots is converted into a density slightly higher or lower than the density of both the target filled area and the adjacent area, and an operation of drawing the extracted dots with the converted density is performed (S510). Thereafter, the drawing process is repeated from the step S501. The density of the boundary line that is slightly higher or lower than the common density of the adjacent two areas that forms the boundary line therebetween is represented, for example, by a density value obtained by adding a value 10 to the density value of the adjacent two areas or by subtracting the value 10 therefrom. Further, when the common density value of the adjacent two areas is equal to or higher than half the maximum density value (765), that is, when the common density value of the adjacent two areas is equal to or higher than the density value of a medium color between black and white, the boundary line is expressed by a density value lower than the common density value of the adjacent two areas. Meanwhile, when the common density value of the adjacent two areas is lower than half the maximum density value, that is, when the common density value of the adjacent two areas is lower than the density value of the medium color between black and white, the boundary line is expressed by a density value higher than the common density value of the adjacent two areas. Specifically, in the case shown in FIG. 3C, the density value for both of the areas a1 and b1 is BW: 510, which is higher than half the maximum density value. Accordingly, the drawing operation is assigned with the boundary line of a density value of BW: 500 obtained by subtracting the value 10 from the density value for both of the areas a1 and b1. When the drawing operations for the filled areas are thus performed, the boundary line between the adjacent two areas that have the same density and the respective different original colors is expressed by a density value slightly higher or lower than the density value of the adjacent two areas. Thereby, it is possible to discriminate the two adjacent areas even in the single-hue image. Additionally, since the density difference between the boundary line and the adjacent two areas is small but enough to differentiate the two adjacent two areas, the appearance is not detracted even after the original color image has been converted into the single-hue image.

In the meantime, when it is not judged in the step S507 that there is a record of an adjacent area of the same density as the area of the target record among the analyzed records stored in the RAM 38 (S507: No), the process is repeated from the step S501. Further, when it is judged in the step S508 that the adjacent area judged to be of the same density has the same original color as the target area (S508: Yes), the process is as well repeated from the step S501. In this manner, when the adjacent area has the same original color as the target area in the step S508, the process goes to the step S501 without performing the dot extracting process for the boundary line (S509). Therefore, when the image data are intended to express adjacent areas as a single area, it is possible to express the adjacent areas as a single area in the single-hue image as well.

In addition, when it is not judged in the step S503 that the target record is a record for an operation of filling a closed area (S503: No), it is judged whether the target record is a record for an operation of drawing a line segment (S512). When it is judged that the target record is a record for an operation of drawing a line segment (S512: Yes), it is judged whether the color restriction mode is active (S513). When it is judged that the color restriction mode is active (S513: Yes), after the color reduction process (S514), an instruction of drawing the line segment is issued (S515). Thereafter, the drawing process is repeated from the step S501. Meanwhile, when it is not judged that the color restriction mode is active (S513: No), the instruction of drawing the line segment is issued (S515) without performing the color reduction process. The drawing process is then repeated from the step S501. Thus, the operation of drawing the line segment is performed.

Meanwhile, when it is not judged in the step S512 that the target record is a record for an operation of drawing a line segment (S512: No), it is judged whether the target record is a record for another drawing operation (e.g., a drawing operation based on raster data) (S516). When it is judged that the target record is a record for another drawing operation (S516: Yes), it is judged whether the color restriction mode is active (S517). When it is judged that the color restriction mode is active (S517: Yes), after the color reduction process (S518), an instruction of the corresponding drawing operation is issued (S519). Then, the drawing process is repeated from the step S501. On the other hand, when it is not judged that the color restriction mode is active (S517: No), the instruction of the corresponding drawing operation is issued (S519) without performing the color reduction process. Thereafter, the drawing process is repeated from the step S501 the corresponding drawing operation is thus carried out. The PC 35 transmits data of the single-hue image generated in this manner to the MFP 1, and the MFP1 prints an image in accordance with the single-hue image data.

Hereinabove, there has been described the drawing process in the case where a target closed area is adjacent to another closed area. When a target closed area overlaps another closed area, a process after the step S505 in the drawing process shown in FIG. 4 is, for instance, represented by a flowchart as shown in FIG. 6.

After the color reduction process has been performed in the step S505, firstly, it is judged whether there is a record of a second area that fully or partially overlaps the target area (S701). When the judgment in the step S701 is affirmative (S701: Yes), it is judged on which side of the second area the target area is (S702). When it is judged that the target area is on the back of the second area (S702: Back), the overlapped portion is specified (S703), and then, an area except the overlapped portion of the target area is defined as a closed area to be filled for the target area (S704).

Thereafter, in a step S705, it is judged whether density difference between the target area and the second area is lower than a predetermined value. When it is judged that the density difference is lower than the predetermined value (S705: Yes), it is judged whether the second area has the same original color as the target area (S706). When it is not judged that the second area has the same original color as the target area (S706: No), the dot extracting process is executed for a boundary portion between the closed area to be filled and the second area (S509).

Subsequently, in a step S707, it is judged whether an average density between the target area and the second area is lower than half the maximum density. When it is not judged that the average density is lower than half the maximum density, namely, when it is judged that the average density is equal to or higher than half the maximum density (S707: No), an operation of drawing the extracted dots of the boundary portion between the closed area to be filled and the second area is performed with a density slightly lower than the average density between the target area and the second area (S708). Thereafter, an operation of filling the closed area to be filled is performed with the single hue of the density corresponding to the sum of the hue components of the target area (S710), and then the drawing process is repeated from the step S501.

Meanwhile, when it is judged that the average density is lower than half the maximum density (S707: Yes), the operation of drawing the boundary line between the overlapped portion and the closed area to be filled is performed with a density slightly higher than the average density (S709). Thereafter, an operation of filling the closed area to be filled is performed with the single hue of the density corresponding to the sum of the hue components of the target area (S710), and then the drawing process is repeated from the step S501.

In the meantime, when the judgment in the step S701 is negative (S701: No), or when it is judged in the step S702 that the target area is on the front of the second area (S702: Front), or when the judgment in the step S705 is negative (S705: No), or when the judgment in the step S706 is affirmative (S706: Yes), the process goes to the step S710. At this time, the closed area to be filled is the same as the target area. Then the drawing process is repeated from the step S501.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, the color reduction process, which is performed by the printer driver in the PC 35 in the embodiment, may be executed by the print processor. In this case, instead of the aforementioned drawing process, an operation of rewriting the intermediate file is performed.

In addition, the processes described in the embodiment may be performed by the MFP 1. In this case, the MFP 1 is configured to perform operations according to commands for drawing a line segment and filling a closed area that are described in the PDL. When a record included in the intermediate file is a record including a command and data for drawing a line segment, the printer driver transmits the command for drawing a line segment to the MFP 1. Meanwhile, when the record included in the intermediate file is a record including a command and data for filling a closed area, the printer driver transmits the command for filling a closed area to the MFP 1. In the case where the aforementioned processes are performed by the MFP 1, the records described with reference to the flowchart shown in FIG. 4 are replaced with drawing commands described in the PDL, respectively. Furthermore, the drawing process shown in FIG. 4 may be executed by a plurality of devices working in conjunction with each other.

In the embodiment, there has been cited an example in which the data generated by the application in the PC 35 are printed. However, the MFP 1 may be configured to have a capability of performing the drawing operation shown in FIG. 4 in addition to a capability of analyzing image data to generate records, and such an MFP 1 may be applied to a case where there are printed text data of a presentation material stored in a USB memory inserted in a USB socket or a memory card inserted in the slot portion 72, image data obtained by scanning the presentation material with the scanner 3, or application data generated by the application that are transmitted by the PC 35 connected with the USB port 71 via the USB cable or a PC connected with the MFP 1 via a LAN.

In the embodiment, the judgment in the step S507 is made based on whether an adjacent area of the target area has the same density as the target area. However, the judgment may be made based on whether an adjacent area of the target area has a density of which difference from the density of the target area is lower than a predetermined value (for example, lower than a value 10). Specifically, in FIG. 3C, the difference of the density value between the area a1 (BW: 510) and the area d1 (BW: 509) is one. Therefore, since the density difference between the areas a1 and d1 is lower than the predetermined value, there is issued a command for drawing a boundary line between the areas a1 and d1 with a density different from those of the area a1 and the area d1. By considering a predetermined value of the density difference when comparing densities of adjacent areas (a target area and an adjacent area) in this manner, it is possible to prevent a problem that the adjacent area of a density, visually almost the same as the target area, is strictly judged to have a density different from the target area based on their accurate density values.

In the embodiment, the present invention is applied to a color printing device. However, the present invention may be applied to data conversion from original color image data to monochrome image data in the PC 35 or a print server connected with a monochrome printer when printing the original color image data with the monochrome printer.

What is claimed is:

1. An image processing device, comprising:
   an image generating unit configured to generate single-hue image data expressed by a single hue from color image data, which single-hue image data includes at least two records, a first record that represents a first area filled with a first color based on first hue component data in the color image data and a second record that represents a second area filled with a second color based on second hue component data in the color image data, the first and second records defining a boundary line by one of line contact and overlap between the first area and the second area;
   a density determining unit configured to determine, on a record-by-record basis, a first density of the first area and a second density of the second area in the single-hue image data based on the first hue component data and the second hue component data, respectively, of the color image data;
   a comparing unit configured to compare the first density with the second density; and
   a boundary generating unit configured to generate the boundary line with the single hue of a third density different from the first and second densities based on the comparison result by the comparing unit.

2. The image processing device according to claim 1, wherein the comparing unit includes a density difference judging unit configured to judge whether a density difference between the first and second densities is lower than a predetermined value, and
   wherein the boundary generating unit is configured to generate the boundary line with the single hue of the third density when the density difference judging unit judges that the density difference is lower than the predetermined value.

3. The image processing device according to claim 1, further comprising a boundary density determining unit configured to determine the third density such that a difference between the third density and an average density between the first and second densities is lower than a predetermined value, and
   wherein the boundary generating unit is configured to generate the boundary line with the single hue of the third density determined by the boundary density determining unit.

4. The image processing device according to claim 1, wherein the comparing unit includes an original color comparing unit configured to judge whether the first color of the first area is different from the second color of the second area in the color image data based on the first hue component data and second hue component data, and
   wherein the boundary generating unit is configured to generate the boundary line with the single hue of the third density when the original color comparing unit judges that the first color is different from the second color.

5. The image processing device according to claim 2, further comprising:
   a density judging unit configured to judge whether an average density between the first and second densities is lower than a predetermined density; and
   a boundary density determining unit configured to determine the third density that is higher than the average density when the density judging unit judges that the average density is lower than the predetermined density and otherwise lower than the average density.

6. An image processing method implemented on a processor comprising steps of:
   generating image data expressed by a single hue from color image data using the processor, the single-hue image data including at least two records, a first record that represents a first area filled with a first color based on first hue component data in the color image data and a second record that represents a second area filled with a second color based on second hue component data in the color image data, the first and second records defining a boundary line by one of line contact and overlap between the first area and the second area;

determining, on a record-by-record basis, a first density of the first area and a second density of the second area in the single-hue image data based on the first hue component data and the second hue component data, respectively, of the color image data;

comparing the first density with the second density; and generating the boundary line with the single hue of a third density different from the first and second densities based on the comparison result in the step of comparing.

7. A computer readable medium having computer readable instructions stored thereon, which, when executed by a computer, cause the computer to perform steps of:

generating single-hue image data expressed by a single hue from color image data, which single-hue image data includes at least two records, a first record that represents a first area filled with a first color based on first hue component data and a second record that represents a second area filled with a second color based on second hue component data, the first and second records of the single-hue image data defining a boundary line by one of line contact and overlap between the first area and the second area;

determining, on a record-by-record basis, a first density of the first area and a second density of the second area in the single-hue image data based on the first hue component data and the second hue component data, respectively, of the color image data;

comparing the first density with the second density; and generating the boundary line with the single hue of a third density different from the first and second densities based on the comparison result in the step of comparing.

8. The computer readable medium according to claim 7, wherein the step of comparing the first density with the second density includes a step of judging whether a density difference between the first and second densities is lower than a predetermined value, and wherein, in the step of generating the boundary line, the boundary line is generated with the single hue of the third density when it is judged that the density difference is lower than the predetermined value.

9. The computer readable medium according to claim 7, wherein the instructions cause the computer to further perform a step of determining the third density such that a difference between the third density and an average density between the first and second densities is lower than a predetermined value, and wherein, in the step of generating the boundary line, the boundary line is generated with the single hue of the third density as determined.

10. The computer readable medium according to claim 7, wherein the step of comparing the first density with the second density includes a step of judging whether the first color of the first area is different from the second color of the second area in the color image data based on the first hue component data and second hue component data, and wherein, in the step of generating the boundary line, the boundary line is generated with the single hue of the third density when it is judged that the first color is different from the second color.

11. The computer readable medium according to claim 8, wherein the instructions cause the computer to further perform steps of:

judging whether an average density between the first and second densities is lower than a predetermined density; and determining the third density that is higher than the average density when it is judged that the average density is lower than the predetermined density and otherwise lower than the average density.

* * * * *